US006993233B2

United States Patent
Shimizu et al.

(10) Patent No.: US 6,993,233 B2
(45) Date of Patent: Jan. 31, 2006

(54) LAMINATED POLYMER OPTICAL WAVEGUIDE AND PROCESS FOR PRODUCING THE SAME

(75) Inventors: Keishi Shimizu, Ashigarakami-gun (JP); Shigemi Ohtsu, Ashigarakami-gun (JP); Kazutoshi Yatsuda, Ashigarakami-gun (JP); Eiichi Akutsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 106 days.

(21) Appl. No.: 10/793,931

(22) Filed: Mar. 8, 2004

(65) Prior Publication Data

US 2005/0018989 A1    Jan. 27, 2005

(30) Foreign Application Priority Data

Jul. 25, 2003    (JP)    ............................... 2003-279743

(51) Int. Cl.
*G02B 6/10* (2006.01)
*G02B 6/12* (2006.01)
*B29D 11/00* (2006.01)

(52) U.S. Cl. .................. 385/129; 385/14; 385/130; 385/131; 264/1.1

(58) Field of Classification Search .................. 385/14, 385/129–131
See application file for complete search history.

(56) References Cited

U.S. PATENT DOCUMENTS 5,204,925 A * 4/1993 Bonanni et al. ............... 385/89

| | | | |
|---|---|---|---|
| 6,039,897 A | 3/2000 | Lochhead et al. | 264/1.24 |
| 6,229,942 B1 * | 5/2001 | Engberg et al. | 385/39 |
| 6,355,198 B1 | 3/2002 | Kim et al. | 264/259 |
| 2004/0001684 A1 * | 1/2004 | Korenaga et al. | 385/132 |

FOREIGN PATENT DOCUMENTS

| JP | A 11-183747 | 7/1999 | ............. 385/147 X |
|---|---|---|---|
| JP | 11-183747 | * 9/1999 | |
| JP | B2 3151364 | 1/2001 | ............. 385/147 X |

OTHER PUBLICATIONS

Michel, B. et al. "Printing meets lithography: Soft approaches to high-resolution patterning." *IBM J. Res. & Dev.* vol. 45, No. 5, Sep. 2001, pp. 697-719.

Xia, Younan et al. "Soft Lithography." *Annual Review of Material Science* 1998, pp. 153-184.

* cited by examiner

*Primary Examiner*—Brian Healy
*Assistant Examiner*—Charlie Peng
(74) *Attorney, Agent, or Firm*—Oliff & Berridge, PLC

(57) ABSTRACT

A laminated polymer optical waveguide including two or more optical waveguide films each of which includes an optical waveguide core on a light-transmissive clad film, the two or more optical waveguide films being laminated on each other by using a clad-forming curable resin having a refractive index close to that of the light-transmissive clad film. The laminated polymer optical waveguide includes, at an end thereof, plural strip-shaped structures which each include at least one optical waveguide core and which can be each independently bent in the direction along which the optical waveguide films are laminated.

13 Claims, 7 Drawing Sheets

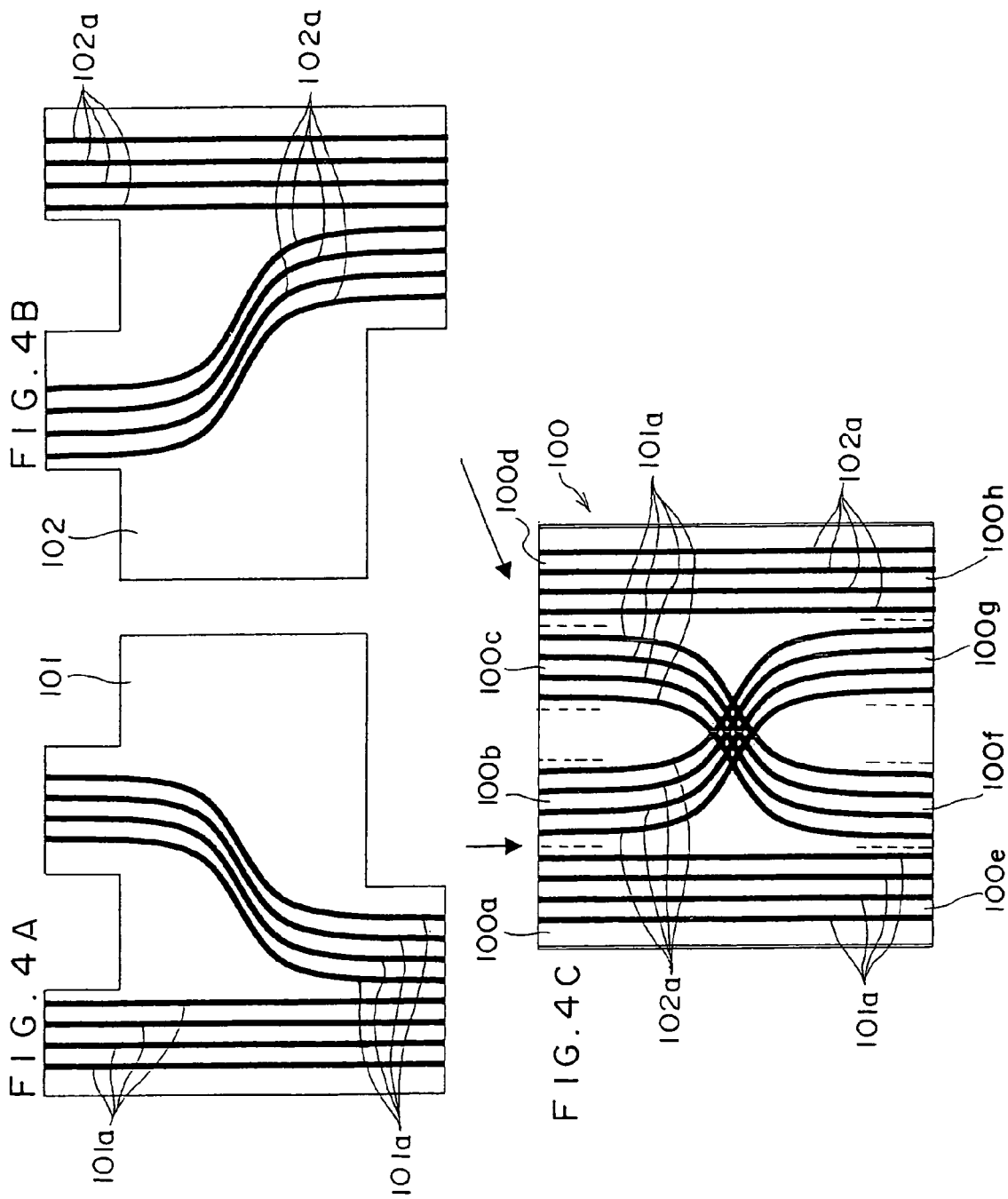

LAMINATED POLYMER OPTICAL WAVEGUIDE AND PROCESS FOR PRODUCING THE SAME

CROSS-REFERENCE TO RELATED APPLICATION

This application claims priority under 35USC 119 from Japanese Patent Application No. 2003-279743, the disclosure of which is incorporated by reference herein.

BACKGROUND OF THE INVENTION

1. Field of the Invention

The present invention relates to an optical waveguide, in particular, a laminated polymer optical waveguide, and a process for producing the same.

2. Description of the Related Art

As a method for producing a polymer waveguide, the following methods have been proposed: (1) a method in which a film is impregnated with a monomer, the core part is selectively exposed to light to change the refractive index and the film is then applied (selective polymerization method); (2) a method in which a core layer and a clad layer are applied and then a clad part is formed by using reactive ion etching (RIE method); (3) a method using a photolithographic method in which a ultraviolet ray-curable resin obtained by adding a photosensitive material in a polymer material is used to carry out exposure and developing (direct exposure method); (4) a method using injection molding and (5) a method in which a core layer and a clad layer are applied and then a core part is exposed to change the refractive index of the core part (photo-bleaching method).

However, the selective polymerization method (1) has a problem concerning the adhesion of the film, and the methods (2) and (3) are poor in cost performance as they employ photolithography. The method (4) has a problem concerning the accuracy of a core diameter. Also, the method (5) has the problem that a sufficient difference in refractive index between the core layer and the clad layer cannot be obtained. At present, only the methods (2) and (3) are practical methods having a high performance in terms of quality. However, these methods have a cost problem as mentioned above. Also, any of the methods (1) to (5) is not applicable to the formation of a polymer optical waveguide on a flexible plastic substrate having a large area.

Also, as a method for producing a polymer optical waveguide, a method is known in which a polymer precursor material for core is filled in a patterned substrate (clad) having a groove pattern formed thereon to be a capillary, then cured to form a core layer and a plane substrate (clad) is applied to the surface of the core layer. However, in this method, there is the problem that the polymer precursor material is not only filled in the capillary groove but also filled thinly in the entire space between the patterned substrate and the plane substrate, the polymer precursor material applied between both substrates is cured to form a thin layer having the same composition as the core layer, resulting in that light leaks through this thin layer.

As one of methods solving this problem, David Heard has proposed a method in which a patterned substrate having a groove pattern formed thereon to be a capillary is fixed to a plane substrate by using a clamping jig, the contact part between the patterned substrate and the plane substrate is further sealed with a resin, followed by dropping the pressure of the system, and then a monomer (diaryl isophthalate) solution is filled in the capillary to produce a polymer optical waveguide (see Japanese Patent No. 3151364). This method is a method that prevents a monomer from being filled in any area other than the capillary by using the monomer in place of a polymer precursor material as a core-forming resin material to lower the viscosity of a filler material and by filling the monomer by utilizing a capillary phenomenon.

However, since this method uses a monomer as the core-forming material, it has the problem that the volume shrinkage factor when the monomer is polymerized into a polymer is large and the transmission loss of the polymer optical waveguide is increased.

Also, this method is such a complicated method that the patterned substrate is fixed with the plane substrate by a clamp and in addition to this process, the contact part is sealed with a resin, and is therefore unfit for mass-production, with the result that no reduction in cost can be expected. Also, it is impossible to apply this method to the production of a polymer optical waveguide using a film having a thickness of the order of millimeters or 1 mm or less as a clad.

George M. Whitesides et al., in Harvard University have recently proposed a method called capillary micro-mold as one of soft lithographic methods in new technologies making a nanostructure. This is a method in which a master substrate is made using photolithography, the nanostructure of the master substrate is exactly copied on a mold of polydimethylsiloxane (PDMS) by utilizing adhesiveness and releasability of the PDMS, and a liquid polymer is flowed into the mold by utilizing a capillary phenomenon and solidified. A detailed explanatory report is made on SCIENTIFIC AMERICAN SEPTEMBER 2001 (Nikkei Science, the December issue (2001)).

Kim Enoch et al., in the group of George M. Whitesides etc., in Harvard University have filed an application for a patent concerning a capillary micro-mold method (see U.S. Pat. No. 6,355,198). However, even if the production method described in this patent is applied to the production of a polymer optical waveguide, a lot of time is required to form a core part because the core part of the optical waveguide has a small sectional area, showing that this method is not suitable to mass-production. This method also has the drawback that a change in volume is caused when the monomer solution is polymerized to form a polymer, leading to a change in the shape of the core with a large transmission loss.

B. Michel et al. in IBM Zürich Research Center have proposed lithographic technologies having high resolution and using PDMS and reported that a resolution of several tens nanometers is obtained. A detailed explanatory report is made on IBM J. RES. & DEV. Vol. 45 No. 5 SEPTEMBER 2001.

As aforementioned, soft lithographic technologies using PDMS and a capillary micro-mold method are technologies on which many countries including the USA focused as nanotechnology.

However, if an optical waveguide is produced using such a micro-mold method as aforementioned, it is not impossible to make volume shrinkage factor small during curing (hence making transmission loss small) and to drop the viscosity of a filler liquid (monomer or the like) to make it easy to fill at the same time. Therefore, the viscosity of the filler liquid cannot be dropped to a certain limit or less, leading to a small filling speed and therefore mass-production is not expected taking it account preferentially to make transmission loss small. Also, the aforementioned micro-mold method is on the premise that a glass or silicon substrate is used as the substrate and it is not considered to use a flexible film substrate in this method.

Thus, the present inventors proposed, in U.S. patent application Publication No. 2004/0022499, a process for producing a laminated polymer optical waveguide comprising the steps of forming an alignment mark and an optical waveguide core section on/in each of optical waveguide films at the same time, and then using the marks to laminate the films. Objects thereof are to provide a process for a polymer optical waveguide to which an alignment mark is attached in order to make the laminating for forming the laminated optical waveguide easy, and to provide a process for producing a laminated polymer optical waveguide wherein laminating is performed using alignment marks.

U.S. patent application Publication No. 2004/0022499 discloses that an alicyclic acrylic resin film, an alicyclic olefin resin film or the like can be used as a member which constitutes a clad of an optical waveguide.

It is difficult to form optical waveguide cores in a film-penetrating direction, and thus it has been difficult to lead optical waveguide cores belonging to different laminated layers to, for example, an optical connector whose cores are arranged along a straight line at regular intervals, such as an MT connector.

As disclosed in, for example, Japanese Patent Application Laid-Open (JP-A) No. 11-183747, optical waveguides belonging to different laminated layers can be led to a single MT connector by a process of: forming optical waveguide films which each have upper and lower clad structures, the thicknesses of which are precisely controlled relative to a single-layer core section, this core section being positioned in a thickness-direction-center of the whole; and laminating the optical waveguide films, thereby arranging the sections of the optical waveguide cores along a straight line in a film-laminating direction. However, the flexibility of the arrangement of the optical waveguide cores is limited. For example, it is impossible to select only some optical waveguide cores from among the optical waveguide cores in an end face of the laminated layers, and arrange the sections of the selected optical waveguide cores along a straight line at regular intervals. This means that the amount of flexibility of arrangement is smaller than an amount of flexibility of arrangement of optical fibers in an optical fiber board produced by laying optical fibers on a polyimide film.

SUMMARY OF THE INVENTION

The present invention has been made in light of the above-mentioned problems in the related art, and the invention attains the following objects.

An object of the invention is to provide a laminated polymer optical waveguide wherein an optical waveguide core belonging to any one of laminated layers can be freely arranged, and a process for producing a laminated polymer optical waveguide at a low cost and in a simple process.

The object can be attained by the laminated polymer optical waveguide according to the invention and the process for producing the same according to the invention, which are described below.

A first aspect of the invention is to provide a laminated polymer optical waveguide including two or more optical waveguide films each of which includes an optical waveguide core on a light-transmissive clad film, the two or more optical waveguide films being laminated on each other by using a clad-forming curable resin having a refractive index close to that of the light-transmissive clad film. The laminated polymer optical waveguide includes, at an end thereof, plural strip-shaped structures which each include at least one optical waveguide core and which can be each independently bent in the direction along which the optical waveguide films are laminated.

In the vicinity of an end of each of the optical waveguide films, an area where the optical waveguide core is not present may be removed.

At least one of the strip-shaped structures may be bent to arrange end faces of the optical waveguide cores in the different strip-shaped structures at given intervals.

The ends of the strip-shaped structures may be fixed to a fixed face in the state that at least one of the strip-shaped structures is bent. The ends of the strip-shaped structures may be fixed to an optical connector.

A second aspect of the invention is to provide a process for producing the laminated polymer optical waveguide of the first aspect. The process includes:

performing the following processes (a) to (e) two or more times to form two or more optical waveguide films:

(a) preparing a mold which is made of a mold-forming-curable resin and has a concave portion corresponding to a convex portion of an optical waveguide core, (b) bringing a light-transmissive clad film into close contact with the mold, (c) filling a core-forming curable resin into the concave portion of the mold with which the light-transmissive clad film is in close contact, (d) curing the filled core-forming curable resin, and (e) removing the mold from the light-transmissive clad film;

laminating the two or more optical waveguide films by using a clad-forming curable resin; and forming plural strip-shaped structures in a laminated product made of the laminated optical waveguide films.

The mold may have plural concave portions to form alignment marks on the optical waveguide films, and the two or more optical waveguide films may be laminated by using the alignment marks.

The process may further include cutting ends of the strip-shaped structures simultaneously in the state in which at least one of the strip-shaped structures is bent and in which end faces of the optical waveguide cores in the different strip-shaped structures are arranged and fixed at given intervals.

According to the laminated polymer optical waveguide of the invention, even if the light-transmissive films that are used have varying thicknesses, the flexibility of the optical waveguide films allows easy positioning in the direction along which the optical waveguide films are laminated (i.e., in the lamination direction). Therefore, the optical waveguide of the invention has an advantage in that it can be connected to an optical connector at lower costs and with a lower connection loss as compared with optical waveguides having other structures and optical fiber laid substrates. An optical waveguide core belonging to any one of the laminated layers can be freely arranged and led to the optical connector.

Further, the process for producing a laminated polymer optical waveguide of the invention has very simple steps. Accordingly, the laminated polymer optical waveguide can be easily produced. Thus, the laminated polymer optical waveguide can be produced at far lower costs as compared with conventional processes for producing a laminated polymer optical waveguide. According to the process of the invention, a flexible laminated polymer optical waveguide which exhibits only a small amount of loss, has a high precision and can be freely mounted to various devices can be obtained. Furthermore, the shape and the like of the laminated polymer optical waveguide can be freely set.

BRIEF DESCRIPTION OF THE DRAWINGS

FIGS. 4A and 4B are top views of optical waveguide films for a laminated polymer optical waveguide of the invention before the films are laminated, and FIG. 4C is a top view of the films after the films are laminated.

DETAILED DESCRIPTION OF THE INVENTION

<Laminated Polymer Optical Waveguide>

The laminated polymer optical waveguide of the present invention is a laminated polymer optical waveguide including two or more optical waveguide films each of which includes at least an optical waveguide core on a light-transmissive clad film. The two or more optical waveguide films are laminated on each other by using a clad-forming curable resin having a refractive index close to that of the light-transmissive clad film. The laminated polymer optical waveguide includes, at an end thereof, plural strip-shaped structures which each contain at least one optical waveguide core and which can be each independently bent in the direction along which the optical waveguide films are laminated. The word "close" in the wording "a clad-forming curable resin having a refractive index close to that of the light-transmissive clad film" means that the refractive index difference between the two is 0.01 or less.

The optical waveguide of the invention has a structure in which end faces of the cores can be flexibly positioned independently of the other parts of the cores, even if greater parts of the optical waveguide films in the laminated polymer optical waveguide are bonded and laminated so that the positions of the plural optical waveguide cores are relatively fixed to each other. The arbitrarily selected end faces of the optical waveguide cores can be arranged at one position or aligned along a straight line. Therefore, the end faces of the laminated optical waveguide cores can be connected with a light-emitting element, a light-receiving element, an optical connector or the like.

The laminated polymer optical waveguide of the invention has, at an end thereof, strip-from structures, and each of the strip-shaped structures can be bent, in the direction along which the optical waveguide films are laminated, independently of its adjacent portions and the body of the laminated polymer optical waveguide.

Figure 1A:
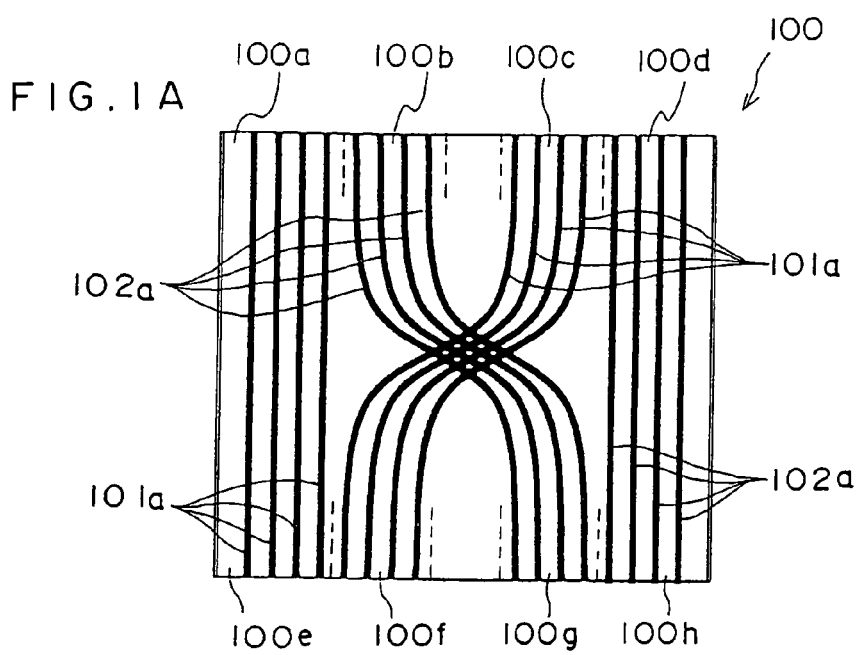
FIGS. 1A to 1D are views of a laminated polymer optical waveguide of the present invention (FIG. 1A is a top view thereof, and FIG. 1B is an end face view thereof).
Figure 1B:
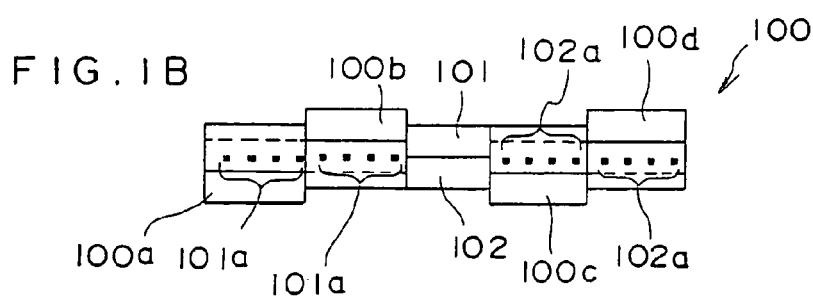

The laminated polymer optical waveguide of the invention is described with reference to the drawings. FIGS. 1A to 1D are views which schematically illustrate an embodiment of the laminated polymer optical waveguide of the invention, wherein FIG. 1A is a top view thereof, and FIG. 1B is a view of a state in which optical waveguide core ends (strip-shaped structures) of the laminated polymer optical waveguide 100 illustrated in FIG. 1A are bent to arrange end faces of the cores along a straight line. The laminated polymer optical waveguide illustrated in FIG. 1A is composed of a light-transmissive clad film, an optical waveguide film 101 (illustrated in FIG. 1C) having eight optical waveguide cores 101a, and an optical film 102 (illustrated in FIG. 1D) having eight optical waveguide cores 102a. The optical waveguide film 101 and the optical waveguide film 102 are laminated on each other by using a clad-forming curable resin having a refractive index close to that of the light-transmissive clad film.

As illustrated in FIG. 1A, cuts (illustrated by broken lines) are made into the vicinities of both ends of the laminated polymer optical waveguide 100. As a result, the vicinities (the upper and lower portions in FIG. 1A) of the laminated polymer optical waveguide 100 have strip-shaped structures 100a, 100b, 100c, 100d, 100e, 100f, 100g, and 100h. Ends of four cores from among the above-mentioned optical waveguide cores are present at each of ends of the strip-shaped structures 100a to 100h. Since the optical waveguide films 101 and 102 are flexible, the strip-from structures 100a to 100h can be each independently bent in the direction along which the optical waveguide films are laminated. Thus, the optical waveguide core end faces having the respective strip-shaped structures can be bent to be arranged at given intervals. In other words, the optical waveguide cores in the respective strip-shaped structures can be arranged along a straight line.

Figure 2A:
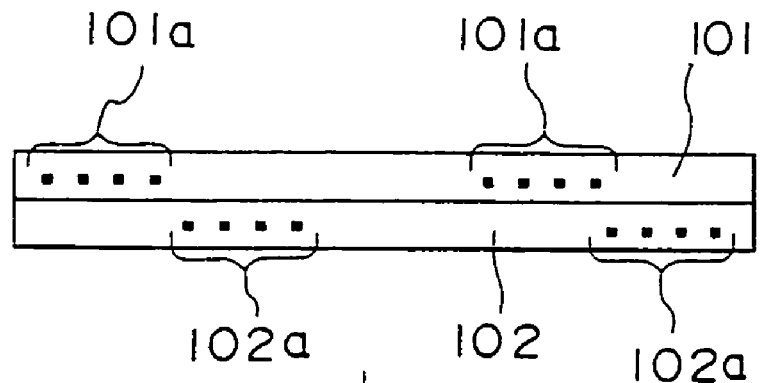
FIGS. 2A to 2C are schematic views illustrating the step of forming strip-shaped structures of the laminated polymer optical waveguide of the invention.
Figure 2B:
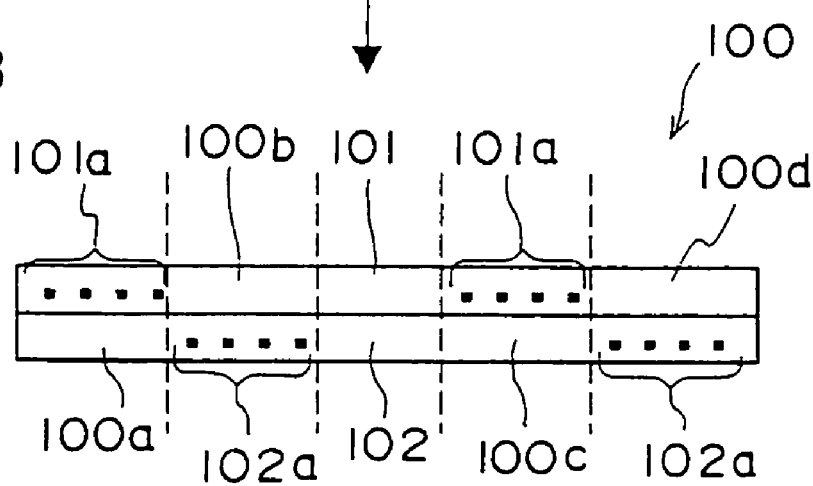
Figure 2C:
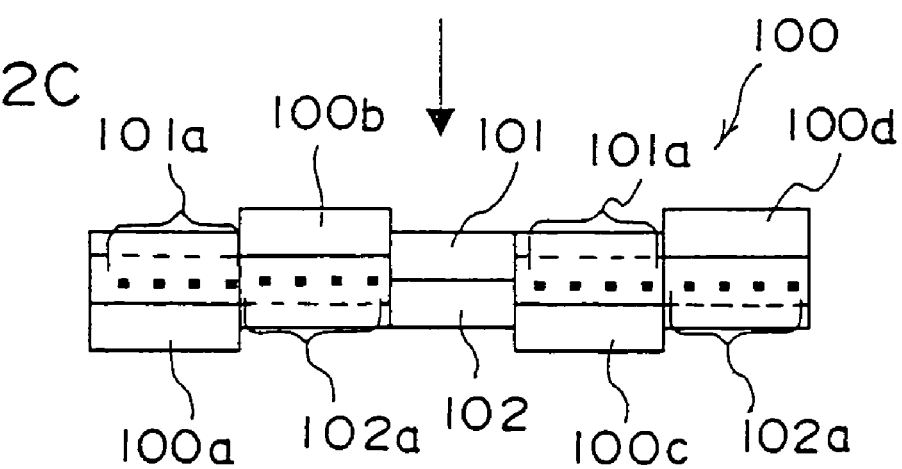
Figure 3:
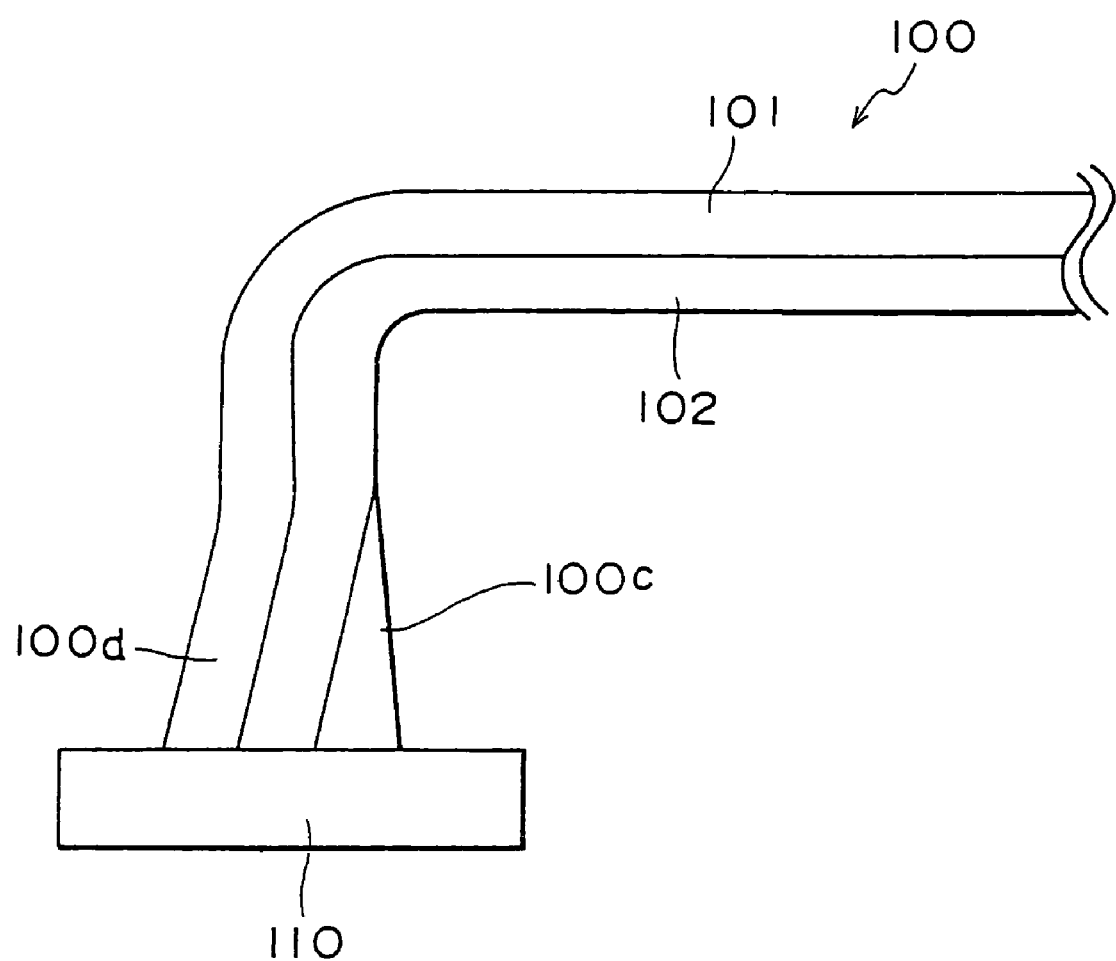
FIG. 3 is a side view illustrating a state in which a VCSEL array is connected to the laminated polymer optical waveguide.

The above-mentioned strip-shaped structures can be formed, for example, as follows. FIGS. 2A to 2C illustrate an embodiment wherein: two optical waveguide films 101 and 102 are laminated; strip-shaped structures are formed in the vicinities of the ends; and end faces of optical waveguide cores are arranged along a straight line and attached to a light-emitting element. FIG. 2A illustrates the state of the two optical waveguide films 101 and 102 illustrated in FIGS. 1C and 1D immediately after the films are laminated. In this state, the end faces of the respective optical waveguide cores are not arranged along a straight line. Next, cuts are made in the vicinities of ends of the laminated films along eight dicing lines shown by broken lines in FIGS. 2A and 2B, so as to form the strip-shaped structures. In this way, the laminated polymer optical waveguide 100 is produced. As illustrated in FIG. 2C, next, the formed strip-shaped structures are belt to arrange the optical waveguide end faces belonging to the respective optical waveguide films along a straight line. In this state, the laminated polymer optical waveguide 100 is bonded to a light-emitting surface of a VCSEL array 110 on which 1×8 light-emitting elements are arranged. The bonding is performed so that the optical waveguide cores 101a and 102a arranged along a straight line correspond with the 1×8 light-emitting elements of the VCSEL array 110. The state that the laminated polymer optical waveguide 100 is bonded to the VCSEL array 110 (the state corresponding to the right side view of FIG. 2C) is illustrated in FIG. 3.

As described above, the optical waveguide cores in the strip-shaped structures can be freely positioned with respect to the lamination direction within the range allowed by the length of the strip-shaped structures. To provide a specific example, if strip-shaped structures having a length (the length of each of the broken lines in FIG. 1A) of 15.7 mm are formed at end portions of a laminated polymer optical waveguide, and a curvature radius thereof is made to be 10 mm, some optical waveguide core end faces can be positioned in a state such that they are bent at right angles to the body of the laminated polymer optical waveguide.

With respect to the strip-shaped structures, it is preferable to cut and remove in advance the portions of the optical waveguide films where no optical waveguide cores are present. FIGS. 4A to 4C are views illustrating examples thereof. In FIGS. 4A to 4C, the same reference numbers are attached to the same constituting elements as in the laminated polymer optical waveguide illustrated in FIGS. 1A to 1D. FIG. 4A is a top view of the optical waveguide film 101, and FIG. 4B is a top view of the optical waveguide film 102. As illustrated in FIGS. 4A and 4B, in the optical waveguide films 101 and 102, cuts are made in areas where no optical waveguide cores are present. FIG. 4c is a top view illustrating a state in which the optical waveguide films 101 and 102 are laminated.

Figure 5A:
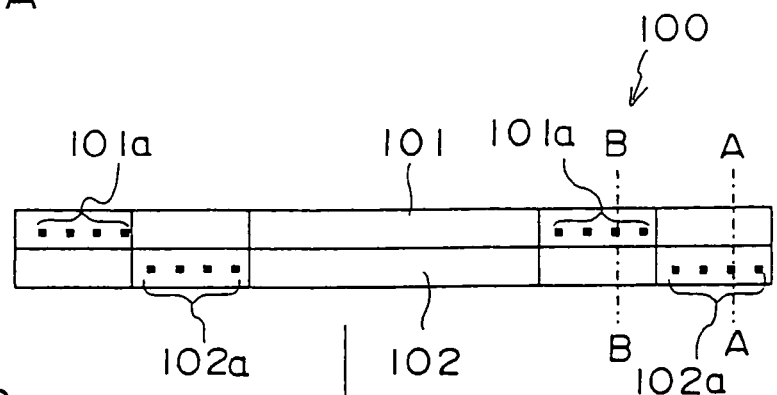
FIGS. 5A to 5D illustrate the step of forming strip-shaped structures of the laminated polymer optical waveguide of the invention, corresponding to FIGS. 4A to 4C.
Figure 5B:
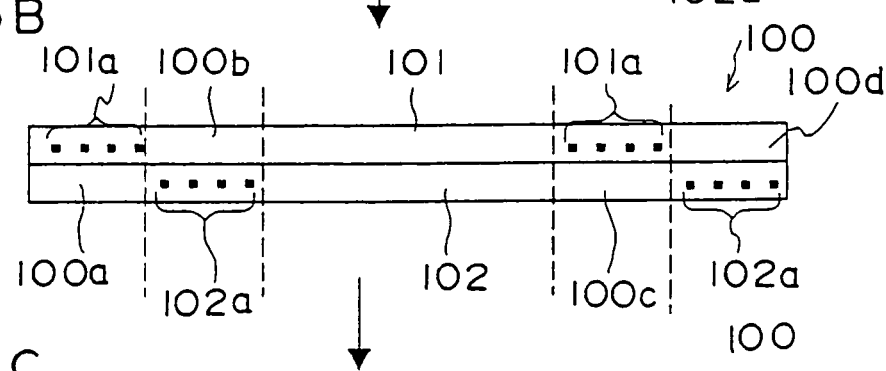
Figure 5C:
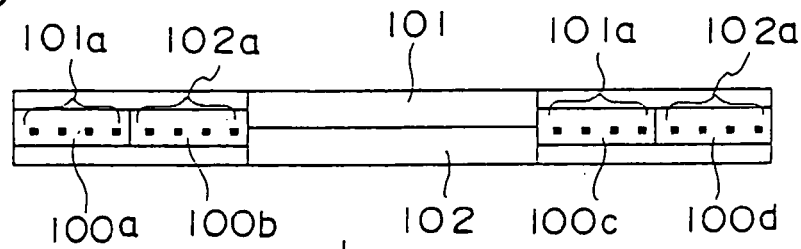
Figure 5D:
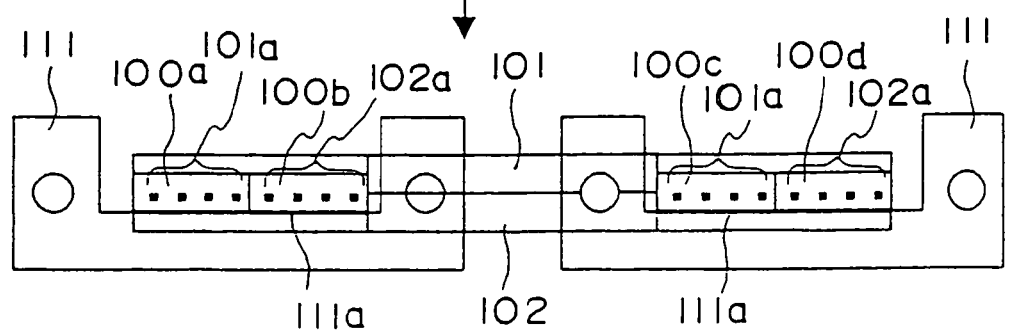
Figure 6A:
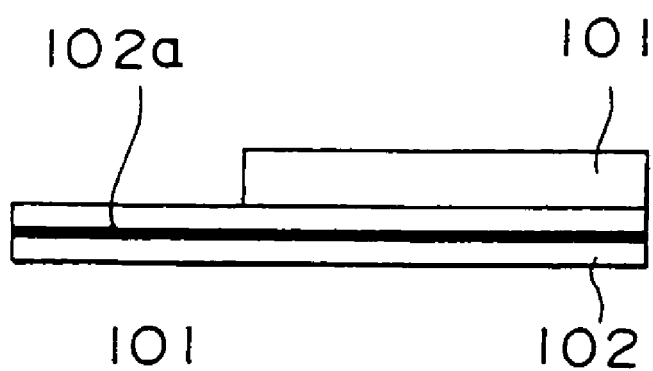
FIGS. 6A and 6B are sectional views taken on line A—A and line B—B of FIG. 5A.
Figure 6B:
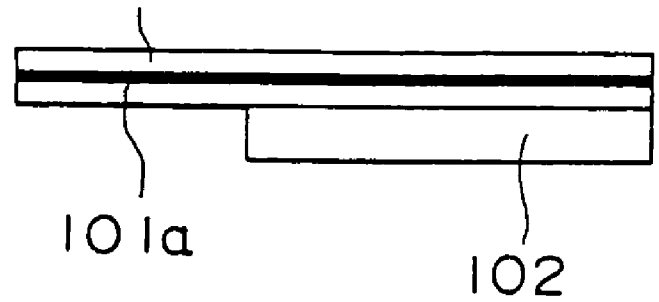

The formation of the strip-shaped structures into the laminated polymer optical waveguide using the optical waveguide films illustrated in FIGS. 4A to 4C can be performed, for example, as follows. FIGS. 5A to 5D illustrate an embodiment wherein: two optical waveguide films 101 and 102 are laminated; the strip-shaped structures are formed in the vicinities of ends thereof; and then end faces of the optical waveguide cores are arranged along a straight line and fixed to an optical connector, the figures corresponding to FIGS. 4A to 4C. In FIGS. 5A to 5D, the same reference numbers are attached to the same constituting elements as in FIGS. 4A to 4C. FIG. 5A illustrates the state of the two optical waveguide films 101 and 102 illustrated in FIGS. 4A and 4B immediately after the films are laminated. In this state, the end faces of the respective optical waveguide cores are not arranged along a straight line. In this state, in sections taken on line A—A and line B—B of FIG. 5A, cuts are made in areas where no optical waveguide cores are present, as illustrated in FIGS. 6A and 6B, respectively. Next, cuts are made in the vicinities of the ends of the laminated films along four dicing lines shown by broken lines in FIG. 5B, so as to form the strip-shaped structures. As illustrated in FIG. 5C, next, the formed strip-shaped structures are bent to arrange the optical waveguide core end faces belonging to the respective optical waveguide films along a straight line. At this time, respective lower faces near the ends of the strip-shaped structures of the laminated polymer optical waveguide 100 are at the same level. The lower faces near the ends of the strip-shaped structures of the laminated polymer optical waveguide 100 can be bonded to various faces present in an optical connector. FIG. 5D illustrates a state in which the lower faces are bonded to a datum face 111a of an MT connector 111.

As illustrated in FIGS. 2A to 2C, by making the cuts beforehand in the areas where no optical waveguide cores are present, the bonding area can be reduced. As a result, the following advantages are produced: the shrinkage of the strip-shaped structures when they are bonded becomes small; and the structures can be easily bent. Furthermore, in the case that the optical waveguide cores are arranged at given positions, it is possible to prevent the generation of steps, arrange the respective optical waveguide core end faces on the same straight line, and simultaneously arrange the lower faces near the respective strip-shaped structure ends into a unified face.

It is also possible that the optical waveguide core end faces present in the separated strip-shaped structure end faces are arranged along a straight line at given intervals (i.e., at a pitch of 250 μm) to be matched with, for example, an end of an MT connector. This can be realized by bending at least one of the strip-shaped structures so as to be aligned with one of strip-shaped structures adjacent thereto with respect to the lamination direction. In order to form the strip-shaped structures, it is necessary to cut the laminated product of the optical waveguide films. When it is assumed that the product is cut with, for example, a dicer, the length of a cutting margin of the product is about 100 μm. Thus, no problems are caused when the optical waveguide core end faces are arranged at a pitch of 250 μm as described in the above-mentioned example.

In order to maintain the relative positional relationship between the optical waveguide core end faces, it is sufficient that at least the ends are fixed to a fixed face in the state that at least one of the strip-shaped structures is bent. The fixed face has a planar structure to which the strip-shaped structures can be bonded. The fixed face can be easily decided by extending a part of the light-transmissive clad film which constitutes the laminated polymer optical waveguide.

In the case that the fixed face is a face of an optical connector which can be connected to another optical waveguide or optical fibers with a mechanical means (such as a positioning pin), for example, an MT connector, the optical waveguide core end face can be easily connected to another optical waveguide by bonding the end face to the fixed face and then making the end faces uniform. This is more specifically described. For example, when the thickness of the light-transmissive clad films is 200 μm and the sectional shape of the optical waveguide cores is a 50 μm square, the optical waveguide cores are arranged along a straight line having a pitch of 250 μm by curing the thickness of the adhesive layer for adhering the material (epoxy resin) of an MT connector to the light-transmissive clad films into 10 μm and setting up lamination-direction fixed faces at positions 235 μm (=200+50/2+10) apart from the centers of the optical waveguide cores. After the completion of the bonding, the centers of the optical waveguide cores can be easily connected to other fibers or the like.

<Materials Used in the Laminated Polymer Optical Waveguide>

The thickness of the light-transmissive clad films used in the optical waveguide films is preferably from 20 μm to 2 mm. If the thickness is thinner than 20 μm, the following problems, are caused: the optical waveguide films cannot be easily handled when the films are laminated; the mechanical strength of the optical waveguide films themselves is not easily kept; when the laminated polymer optical waveguide is produced, bending strength is applied to the optical waveguide cores so that the cores are easily warped; it is feared that the yield is deteriorated or the performance is remarkably lowered; and the function of the clad films becomes incomplete, and light may leak therefrom.

It is desirable from the viewpoint of costs besides the above-mentioned point that the optical waveguide films are as thin as possible as far as the design pitch (core pitch in the lamination direction) of the optical waveguide films permits. This is based on the following reason: clad-forming curable resins (ultraviolet ray-curable resin or heat-curable resin) which can be used for optical waveguides are generally expensive; therefore, when the use amount thereof is made as small as possible, the costs become lower. However, if the thickness of the light-transmissive clad films is larger than 2 mm, the films become rigid. Thus, the flexibility of the films is not sufficient enough to have each optical waveguide distributed or connected to a connector. Thus, the thickness is preferably 2 mm or less.

In the case that the light-transmissive films are thin so that the use amount of the clad-forming curable resin becomes large to obtain a necessary core pitch, it is possible to use, as the optical waveguide film, a film wherein an optical waveguide core is formed on a clad film and further another light-transmissive clad film is laminated thereon by using a clad-forming curable resin or the like.

This clad-forming curable resin also functions as an adhesive agent for adhering the optical waveguide films to each other. Use of an ultraviolet ray-curable resin as the curable resin makes it possible to ensure good light-transmissibility. The ultraviolet ray-curable resin has various types such as an acrylic type or an epoxy type. A non-solvent type ultraviolet ray-curable resin having a volume shrinkage ratio of about 4 to 5% is commercially available, and can be easily obtained. The volume shrinkage ratio can be made lower by use of a heat-curable resin in this part. In this case, it is necessary to consider a difference in volume shrinkage ratio between the resin and other members or moieties (for example, a holding jig or the clad film), dependently on heating temperature.

With respect to the volume shrinkage ratio, the thickness of the cured layer of the clad-forming curable resin present between the upper surface of the core and the clad film positioned thereon is thinner by a value equal to the height of the core. Therefore, the thickness can be easily set at 10 $\mu$m or less. Accordingly, a pitch change following the volume shrinkage of this part can be neglected.

[Formation of the Optical Waveguide Film]

The following describes the process for forming the optical waveguide film. First, a mold-forming-curable resin is applied or injected onto a master plate wherein a convex portion corresponding to an optical waveguide core is formed, and then the resin is cured to obtain a cured resin layer. This layer is removed from the master plate as a mold having a concave portion corresponding to the convex portion of the optical waveguide core. A clad film as described above is brought into close contact with the mold. A core-forming curable resin is filled into the concave portion of the mold, and the filled resin is cured. Finally, the mold is removed to provide the optical waveguide film. Thereafter, by laminating the same clad film as described above onto the core-forming surface of the optical waveguide film with an adhesive agent (a clad-forming curable resin or the like), a different embodiment of the optical waveguide film may be formed. Specifically, the optical waveguide film of this embodiment can be obtained by adhering, onto the optical waveguide film formed by the above-mentioned method, a different clad film with an adhesive agent having a refractive index close to that of the clad film. The used adhesive agent is preferably an ultraviolet ray-curable resin or heat-curable resin. An example thereof may be an ultraviolet ray-curable or heat-curable monomer or oligomer, or a mixture of the monomer or the oligomer.

The refractive index difference between the two clad films is preferably as small as possible, and the difference is preferably 0.05 or less, more preferably 0.001 or less, and even more preferably zero in order to confine light.

<Process for Producing the Laminated Polymer Optical Waveguide>

The above-mentioned laminated polymer optical waveguide of the invention can be produced by the process for producing a laminated polymer optical waveguide according to the invention. The process for producing a laminated polymer optical waveguide according to the invention includes the following steps (1) to (3):

(1) performing the following processes (a) to (e) two or more times to form two or more optical waveguide films:

(a) preparing a mold which is made of a cured resin layer of a mold-forming-curable resin and has a concave portion corresponding to a convex portion of an optical waveguide core, (b) bringing a light-transmissive clad film into close contact with the mold, (c) filling a core-forming curable resin into the concave portion of the mold with which the light-transmissive clad film is in close contact, (d) curing the filled core-forming curable resin, and (e) removing the mold from the light-transmissive clad film;

(2) laminating the two or more optical waveguide films by using a clad-forming curable resin; and (3) forming plural strip-shaped structures in a laminated product made of the laminated optical waveguide films.

The steps (1) to (3) of the production process according to the invention are described in detail hereinafter.

(1) Forming Optical Waveguide Films

Hereinafter, the process for forming optical waveguide films according to the invention is described in the order of the steps.

(a) Preparing a Mold which is Made of a Cured Resin Layer of a Mold-Forming-Curable Resin and has a Concave Portion Corresponding to a Convex Portion of an Optical Waveguide Core The formation of the mold is preferably performed using a master plate wherein a convex portion corresponding to an optical waveguide core is formed. However, the method for the formation is not limited to this. The method using such a master plate is described hereinafter.

<Formation of a Master Plate>

To form a master plate wherein a convex portion corresponding to an optical waveguide core is formed, a conventional method, for example, a photolithography or RIE method can be used without any restriction. The method for forming a polymer optical waveguide by electrodeposition or photo-electrodeposition filed by the present Applicant (JP-A No. 2002-333538) may be applied to the formation of the master plate. The size of the convex portion which is formed in the master plate and corresponds to the optical waveguide core, which is appropriately decided dependently on the use of the polymer optical waveguide to be produced, is generally from about 5 to 500 $\mu$m, preferably from about 40 to 200 $\mu$m. In the case that the polymer optical waveguide is, for example, a single mode optical waveguide, a core about 10 $\mu$m square is generally used. In the case that the optical waveguide is a multimode optical waveguide, a core about 50 to 100 $\mu$m square is generally used. An optical waveguide having a core portion having a larger size (e.g., about several ten hundred micrometers) may be used dependently on use.

<Formation of the Above-Mentioned Mold>

The mold is formed by applying or injecting a mold-forming-curable resin onto the surface of the master plate (formed as above) on which the convex portion corresponding to the core is formed; optionally drying the curable resin; curing the resin; and then taking the cured resin layer from the master plate. The mold has the following: an inlet for filling a core-forming curable resin into the concave portion corresponding to the convex portion; and an outlet for discharging the resin from the concave portion corresponding to the convex portion. The method for the formation thereof is not particularly limited. Convex portions corresponding to the inlet and the outlet may be made in the master plate in advance. A simple method for forming the inlet and the outlet is, for example, a method of forming a cured resin layer made of a mold-forming-curable resin on the master plate, removing the layer as a mold, and subsequently cutting both ends of the mold to make the concave portion bared.

It is effective to make through holes connecting to the concave portion of the mold at both ends of the concave portion. The through hole on the inlet side can be used as a liquid (resin) reservoir. Into the through hole on the outlet side is inserted a pressure-reducing suction tube, whereby the inside of the concave portion can be connected to a pressure-reducing suction apparatus. In accordance with the pitch of the plural concave portions, a through hole may be made correspondingly to each of the concave portions. One through hole connecting in common to the concave portions may be made.

The thickness of the cured resin layer may be appropriately decided, considering the handling performance thereof as a mold. In general, the thickness is suitably from about 0.1 to 50 mm.

It is desirable to promote the removing of the master plate from the mold by conducting a releasing treatment such as application of a releasing agent to the master plate.

The mold-forming-curable resin preferably has the following properties: the cured product produced therein can be easily removed from the master plate; the cured product has a mechanical strength and a dimensional stability at certain levels enough for repeated use as a mold; the cured product has a hardness for keeping the shape of the concave portion; and the cured product has a good adhesiveness to the light-transmissive clad film. Various additives may be added to the resin if necessary.

The mold-forming-curable resin can be applied or injected onto the surface of the master plate and must make a precise replication of the convex portions corresponding to the individual optical waveguide cores made in the master plate. Therefore, the resin preferably has a viscosity not more than a certain limit, for example, a viscosity of about 500 to 7000 mPa·s. (Examples of the "mold-forming-curable resin" used in the invention include resins that will turn into the form of a rubber, which has elasticity, after the resins are cured.) A solvent for adjusting the viscosity may be added to the resin to such an extent that a bad effect is not produced by the solvent.

The mold-forming-curable resin is preferably a curable organopolysiloxane, which will be a silicone rubber (silicone elastomer) or a silicon resin after the polysiloxane is cured, from the viewpoints of the removing ability, mechanical strength, dimensional stability, hardness and adhesiveness thereof to the light-transmissive clad film as described above. The curable organopolysiloxane is preferably an organopolysiloxane containing in the molecule thereof a methylsiloxane group, an ethylsiloxane group or a phenylsiloxane group. The curable organopolysiloxane may be of a one-liquid type or a two-liquid type, wherein the polysiloxane is used in combination with a hardener. The curable organopolysiloxane may be of a heat curing type or a room temperature curing type (for example, a type of being cured with water content in the air). The curable organopolysiloxane may be of a type using a different curing way (such as an ultraviolet ray curing way).

The curable organopolysiloxane is preferably a curable organopolysiloxane which will become a silicone rubber after the polysiloxane is cured. As this rubber, a rubber which is usually called liquid silicone rubber is used. (Examples of the "liquid" rubber also include high-viscosity silicone rubbers, such as pasty silicone rubber). The liquid silicone rubber is preferably of a two-liquid type, wherein the rubber is used in combination with a hardener. In particular, an addition type liquid silicone rubber is preferable for the following reasons: the rubber is cured, for a short time, into a state in which the surface and the inside thereof are even; byproducts are never or hardly generated; and the rubber has an excellent releasing ability and a small shrinkage ratio.

Among various kinds of the liquid silicone rubber, a liquid dimethylsiloxane rubber is particularly preferable from the viewpoints of the adhering ability, removing ability, strength and hardness thereof. Since the refractive index of the cured product of the liquid dimethylsiloxane rubber is generally as low as about 1.43, a mold made from this rubber can be used, as it is, as a clad layer without being removed from the light-transmissive clad film. In this case, it is necessary to adopt a means to ensure the mold not to separate from the filled core-forming resin and the light-transmissive clad film.

The liquid silicone rubber preferably has a viscosity of 500 to 7000 mPa·s, and more preferably 2000 to 5000 mPa·s in order to make a precise replication of the convex portion corresponding to the optical waveguide core to be formed, make the incorporation of bubbles into the rubber less so as to make defoaming easy, and make the thickness of the resultant mold into several millimeters.

The surface energy of the mold is preferably from 10 to 30 dyn/cm, and preferably 15 to 24 dyn/cm from the viewpoints of the adhesiveness between the substrate film and the mold and the impregnation speed of the core-forming curable resin.

The Share rubber hardness of the mold is preferably from 15 to 80, preferably from 20 to 60 from the viewpoints of the mold-releasing performance, the maintenance of the shape of he concave portion and the removing ability of the rubber.

The surface roughness (root-mean-square roughness (RMS)) of the mold is usually cured into 0.5 µm or less, preferably 0.1 µm or less, and more preferably 0.05 µm or less. In this way, about the optical waveguide characteristics of the formed core, the optical loss thereof can be largely reduced.

It is preferable that the mold has light-transmissibility within the ultraviolet ray range and/or the visible ray range. The reason why it is preferable that the mold has light-transmissibility within the visible ray range is that when the mold is adhered closely to a light-transmissive clad film in the step (b) described below, the positioning thereof can be easily performed and further in the step (c) described below the situation that a core-forming curable resin is filled into the concave portion of the mold can be observed so that the completion of the filling can be easily checked. The reason why it is preferable that the mold has light-transmissibility within the ultraviolet ray range is that when an ultraviolet ray-curable resin is used as the core-forming curable resin, the resin is cured by the radiation of the ultraviolet rays through the mold. It is preferable that the transmittance of the mold is 80% or more with the ultraviolet ray range (wavelengths of 250 to 400 nm).

The curable organopolysiloxane, in particular, the liquid silicone rubber, which will be a silicone rubber after the liquid rubber is cured, is excellent in contradict abilities of the adhesiveness thereof to the light-transmissive clad film and the removing ability thereof from this film, has the capability of making a replication of a nano-structure, and prevents even invasion of liquid when the silicone rubber is adhered closely to the light-transmissive clad film. Since the mold made of such a silicone rubber makes a precise replication of the master plate and adheres closely to the light-transmissive clad film sufficiently, a core-forming curable resin, which will be used in the step (c), can be efficiently filled into only the concave portion between the mold and the light-transmissive clad film. Furthermore, the mold can be easily removed from the light-transmissive clad film. Accordingly, a polymer optical waveguide having a highly precise shape can be very simply produced from this mold.

About the curable resin layer, in particular, the curable resin having rubbery elasticity, a portion of the cured resin layer, that is, a portion other than the portion for making a replication of the master plate convex portion can be substituted with a different rigid material. In this case, the handling performance of the mold is improved.

(b) Bringing a Light-Transmissive Clad Film into Close Contact with the Mold

The kind of the light-transmissive clad film used in the invention is not limited, and examples thereof include a glass substrate, a ceramic substrate, and a plastic substrate. A product wherein such a substrate is coated with a resin to control the refractive index may be used. The refractive index of the light-transmissive clad film is preferably less than 1.55, and more preferably less than 1.50. It is particularly necessary that the refractive index is less than the refractive index of a core material which will be obtained in the step (d), by 0.01 or more. About the light-transmissive clad film, it is preferable that: the film is flat and excellent in adhesiveness to the mold; and when the two are adhered closely to each other, no cavity other than the concave portion of the mold is generated. When the adhesiveness of the light-transmissive clad film to the mold and/or the core is not very good, it is preferable to conduct treatment with an ozone atmosphere or radiating-treatment with ultraviolet rays having wavelengths of 300 nm or less, thereby improving the adhesiveness of the clad film to the mold or the core.

A polymer optical waveguide using a flexible film substrate, from among various plastic substrates, can also be used as optical connections between couplers or boards, optical splitters, or others. The film substrate is selected dependently on the use of the polymer optical waveguide to be produced, considering the optical properties thereof (such as the refractive index and light-transmissibility thereof), the mechanical strength, the heat resistance, the adhesiveness to the mold, and the flexibility thereof.

Examples of the material of the light-transmissive clad film include acrylic resins (such as polymethyl methacrylate), alicyclic acrylic resins, styrene resins (such as polystyrene, acrylonitrile/styrene copolymer), olefin resins (such as polyethylene, polypropylene, and ethylene/propylene copolymer), alicyclic olefin resins, vinyl chloride resins, vinylidene chloride resins, vinyl alcohol resins, vinylbutyral resins, arylate resins, fluorine-containing resins, polyester resins (such as polyethylene terephthalate, and polyethylene naphthalate), polycarbonate resins, cellulose bi- or tri-acetate, amide resins (such as aliphatic, and aromatic polyamides), imide resins, sulfone resins, polyethersulfone resins, polyetheretherketone resins, polyphenylenesulfide resins, polyoxymethylene resins, and blends thereof.

In the case that the adhesiveness of the light-transmissive clad film to the mold and/or the core is not very good, it is preferable to conduct treatment with an ozone atmosphere or radiating-treatment with ultraviolet rays having wavelengths of 300 nm or less, thereby improving the adhesiveness thereof to the mold or the core.

Examples of the alicyclic acrylic resin include an OZ-1000, and an OZ-1100 (manufactured by Hitachi Chemical Co., Ltd.), wherein an alicyclic hydrocarbon such as tricyclodecane is introduced in an ester substituent.

Examples of the alicyclic olefin resin include resins having in the main chain thereof a norbornene structure, and resins having in the main chain a norbornene structure and also having in the side chains thereof polar groups such as alkyloxycarbonyl groups (examples of the alkyl group including alkyl groups having 1 to 6 carbon atoms, and cycloalkyl groups). In particular, the alicyclic olefin resins having in the main chain a norbornene structure and also having in the side chains thereof polar groups such as alkyloxycarbonyl groups have excellent optical properties, such as a low refractive index (of about 1.50, which makes it possible to keep the refractive index difference between the core and the clad), and a high light transmissibility; excellent adhesiveness thereof to the mold; and excellent heat resistance. Accordingly, this resin is particularly suitable for producing the polymer optical waveguide of the invention.

The refractive index of the light-transmissive clad film is desirably less than 1.55, more desirably less than 1.53 in order to keep the refractive index difference between the light-transmissive clad film and the core.

(c) Filling a Core-Forming Curable Resin into the Concave Portion of the Mold with which the Light-Transmissive Clad Film is in Close Contact In order to fill a core-forming curable resin into the concave portion of the mold, the following method is performed: a method of bringing the light-transmissive clad film which is a size larger than the mold into close contact with the mold, dropping down a small amount of the core-forming curable resin into the inlet of the concave portion to fill the resin by use of capillarity; a method of filling the resin into the concave portion under applied pressure; a method of filling the resin into the concave portion while sucking the air from the outlet thereof; a method of filling the resin into the concave portion under applied pressure while sucking the air from the outlet thereof; or some other method. In the case that the through holes are made at ends of the concave portion as described above, it is possible to store the resin into the inlet side through hole and fill the resin under applied pressure, or insert a pressure-reducing suction tube connected to a pump into the outlet side through hole and then sucking the air.

In the case that the filling under applied pressure and the suction of the air are used together, it is preferable to perform them in synchronization with each other and further increase the applied pressure step by step in the filling under the pressure while decreasing the pressure step by step in the suction of the air since contradict states that the mold is stably fixed and the core-forming curable resin is speedier injected can be made compatible with each other.

As the core-forming curable resin, radial ray curable, electron beam curable, ultraviolet ray curable, heat curable, and other curable resins can be used. The ultraviolet ray curable and heat-curable resins are particularly preferable.

A preferable example of the core-forming ultraviolet ray-curable or heat-curable resin is an ultraviolet ray-curable or heat-curable monomer or oligomer, or a mixture of the monomer and the oligomer.

Preferable examples of the ultraviolet ray-curable resin include epoxy, polyimide and acrylic ultraviolet rays.

It is necessary that the core-forming curable resin has a sufficiently low viscosity for making it possible to fill the resin into the gap made between the mold and the light-transmissive clad film (i.e., the concave portion of the mold). The viscosity of the curable resin is preferably from 10 to 2000 mPa·s, more preferably from 100 to 1000 mPa·s, and even more preferably from 300 to 700 mPa·s from the viewpoints of the resin-filling speed, goodness of the core shape, and smallness in optical loss.

In order to reproduce the original shape of the convex portion corresponding to the optical waveguide core formed in the master plate with a high precision, it is also necessary that a change in the volume is small before and after the curable resin is cured. For example, a decrease in the volume causes optical wave conduction loss. Accordingly, it is desirable that the change in the volume of the curable resin is as small as possible. The volume change ratio is preferably 10% or less, and more preferably from 0.01 to 5%. If a solvent is used to make the viscosity low, the volume change before and after the resin is cured is large. It is therefore preferable to avoid the use of the solvent if possible.

In order to decrease the volume change (shrinkage) based on the curing of the core-forming curable resin, a polymer may be added to the resin. The polymer is preferably a polymer having compatibility with the core-forming curable resin and producing no bad effect on the refractive index, elasticity and transmissibility of the resin. The addition of the polymer makes it possible to control the viscosity or the glass transition point of the curable resin at a high level, as well as decrease the volume change. The polymer may be, for example, an acrylic, methacrylic or epoxy polymer, but is not limited thereto.

The refractive index of the cured product of the core-forming curable resin is preferably in the range of from 1.20 to 1.60, and more preferably from 1.4 to 1.6. Two or more resins that have different indexes within this range when they are cured may be used.

It is necessary that the refractive index of the cured product of the core-forming curable resin is larger than that of the above-mentioned film substrate (including a clad layer in the step (e) described below), which will be a clad. The difference between the refractive index of the core and that of the clad (the light-transmissive clad film and the clad layer) is 0.01 or more, and preferably 0.04 or more.

In order to promote the filling of the core-forming curable resin into the concave portion of the mold by capillarity in this step, it is desirable to reduce the pressure of the whole of the system (into about 0.1 to 100 kPa).

To promote the filling, it is also effective to not only reduce the pressure of the system but also heat the core-forming curable resin filled from the inlet of the mold to make the viscosity thereof lower.

(d) Curing the Filled Core-Forming Curable Resin

The filled core-forming curable resin is cured. To cure the core-forming curable resin of an ultraviolet ray curing type, an ultraviolet ray lamp, an ultraviolet ray LED, a UV radiating apparatus or the like is used. To cure the resin of a heat curing type, heating in an oven or the like is used.

(e) Removing the Mold from the Light-Transmissive Clad Film

After the step (d), the mold is removed from the light-transmissive clad film. The mold used in the steps (a) to (d) may be used, as it is, as a clad layer if the mold satisfies the above-mentioned requirements about the refractive index and others. In this case, the mold is not required to be removed and is used, as it is, as a clad layer. In order to improve the adhesiveness between the mold and the core material in this case, it is preferable to treat the mold with ozone.

In the process for producing a laminated polymer optical waveguide according to the invention, two components in the following combination have a particularly high adhesiveness therebetween: a combination in which: a liquid silicone rubber which will turn into a rubber form after being cured (in particular, a liquid dimethylsiloxane rubber) is used as the mold-forming-curable resin; and an alicyclic olefin resin having in the main chain thereof a norbornene structure and also having in side chains thereof polar groups such as alkyloxycarbonyl groups is used as the light-transmissive clad film. Furthermore, in this combination, the structure of the mold concave portion does not deform. Additionally, even if the sectional area of the concave portion structure is very small (for example, an area 10 micrometers square), the curable resin can quickly be filled into the concave portion.

The following describes an embodiment of the process for forming an optical waveguide film with reference to the drawings.

Figure 7A:
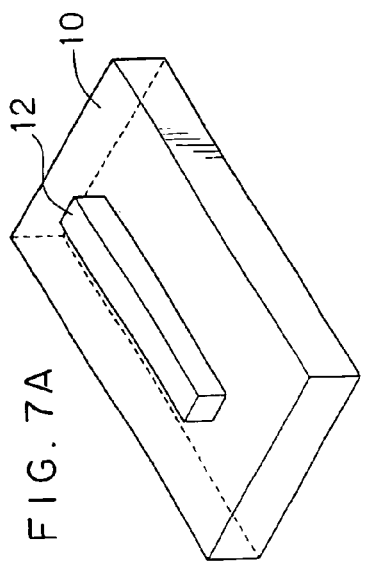
FIGS. 7A to 7F are schematic views illustrating the step of forming an optical waveguide film.
Figure 7B:
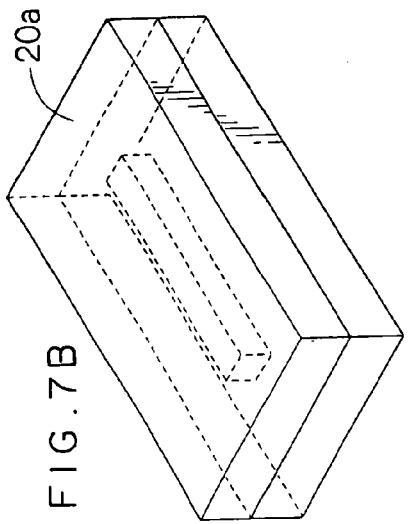
Figure 7C:
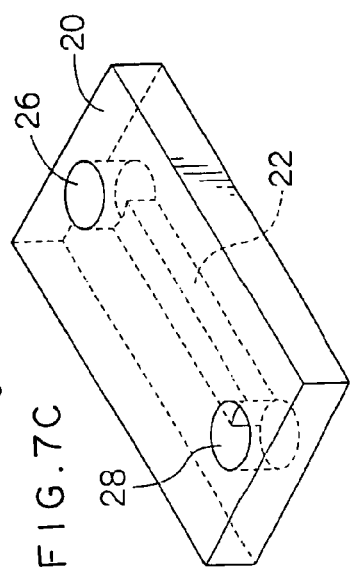

FIG. 7A illustrates a master plate 10. Reference number 12 represents a convex portion corresponding to an optical waveguide core. A mold-forming-curable resin is applied or injected onto the convex portion formed surface of the master plate 10, and then the resin is cured (see FIG. 7B). In FIG. 7B, reference number 20a represents a cured resin layer. Thereafter, the cured resin layer 20a is removed as the cured resin layer 20a on which a concave portion is formed (not illustrated in figs.). Through holes 26 and 28 connecting to the concave portion 22 are made in the cured resin layer 20, wherein the concave portion 22 is formed, by punching out the layer 20 at positions of both ends of the concave portion. In this way, a mold 20 is obtained (see FIG. 7C).

Figure 7D:
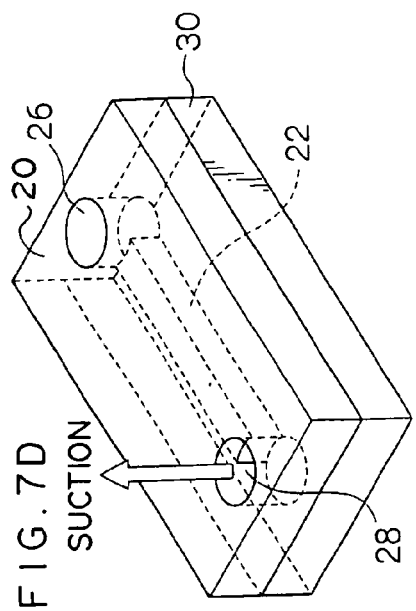
Figure 7E:
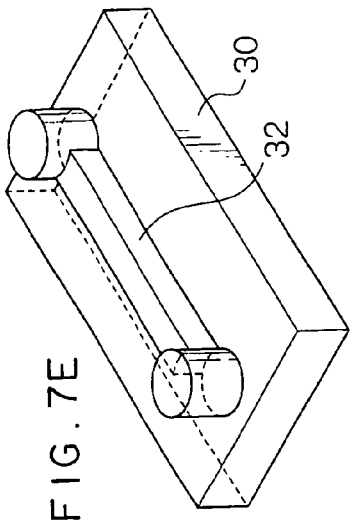

As illustrated in FIG. 7D, next, a core-forming curable resin is put into the through hole 26 made in the mold. The air is sucked from the through hole 28 at the other end (or the resin is filled under applied pressure, or the two operations may be combined) so as to fill the core-forming curable resin into the concave portion 22 of the mold. Thereafter, the resin is cured and then the mold is removed to form cured resin portions in the optical waveguide core 32 and the through holes 26 and 28 on a light-transmissive clad film 30. Finally, the resin portions cured in the through holes are cut off with a dicer or the like to produce an optical waveguide film (see FIG. 7E). End faces of the core have mirror plane smoothness.

(2) Laminating the Two or More Optical Waveguide Films by Using a Clad-Forming Curable Resin A laminated polymer optical waveguide can be produced by laminating the optical waveguide films formed by the step as described above by use of a clad-forming curable resin.

In the case that the optical waveguide films have no clad films laminated on the core-formed surface, a clad film may be laminated on the core-formed surface of the optical waveguide film as the topmost layer with an adhesive agent, or a clad layer made of a cured layer of a clad-forming curable resin may be formed on the core-formed surface.

In the invention, it is preferable to use, as the above-mentioned mold, a mold having plural concave portions for forming alignment marks to form the alignment marks on the respective optical waveguide films, and use the alignment marks to laminate the two or more optical waveguide films. The alignment marks can be easily recognized with an optical microscope or the like.

(3) Forming Plural Strip-Shaped Structures in a Laminated Product made of the Laminated Optical Waveguide Films Cuts are made in the vicinities of ends of the lamination wherein the two or more optical waveguide films are laminated as described above, so as to form strip-shaped structures wherein optical waveguide cores are present. The strip-shaped structures can be bent, in the lamination direction, independently of portions adjacent thereto and the body of the laminated polymer optical waveguide, as described above.

When the cuts are made, the depth of the cuts can be appropriately determined, considering the bending angle of the strip-shaped structures, the connecting ability of the laminated polymer optical waveguide to a different member such as a connector, and an increase in optical wave conduction loss generated by the length of the optical waveguide itself. The depth is preferably from 1 to 30 mm, and more preferably from 5 to 15 mm.

It is necessary to make the strip-shaped structures which are to be bent so as to adjust the positions thereof slightly larger than the strip-shaped structures which are not to be bent, and bend the former strip-shaped structures to make positions of all the end faces even. As a result, the lengths of the strip-shaped structures of each of the optical waveguide films which should be laminated are required to be changed so that the yield may deteriorate. Consequently, costs may rise. In this case, the pitch of the optical waveguide cores can be easily adjusted by bending at least one of the strip-shaped structures and then cutting ends of the strip-shaped structures simultaneously with a dicer or the like in the state that the end faces of the optical waveguide cores in the different strip-shaped structures are arranged and fixed at given intervals.

EXAMPLES

The present invention is more specifically described by way of the following examples. However, the examples should not be construed to limit the scope of the invention.

Example 1

<Formation of a Master Plate>

Figure 1C:
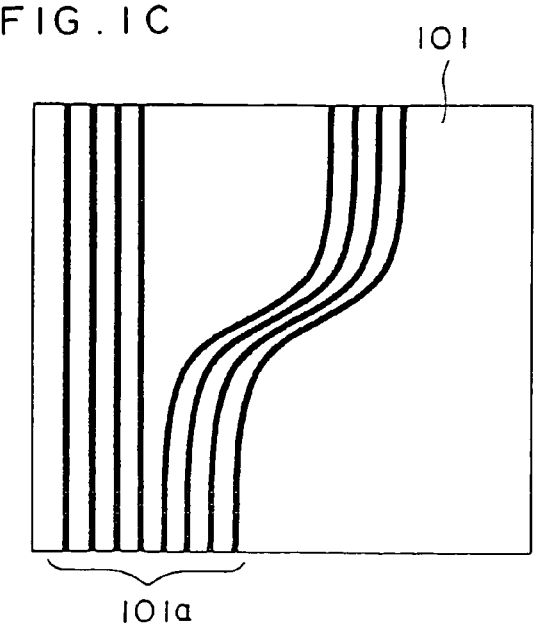
Figure 1D:
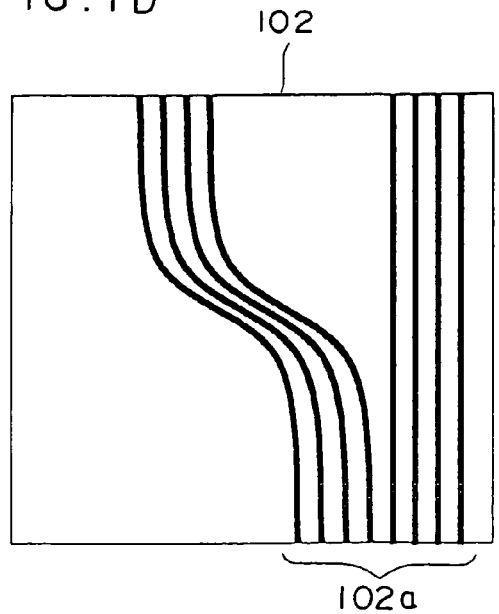

A thick film resist (SU-8, manufactured by MicroChem Corp.) is applied onto a Si substrate by spin coating, and then the resultant is pre-baked at 80° C., exposed to light through a photomask and developed to form the following: eight convex portions (width: 50 µm, height: 50 µm, length: 50 mm, and adjacent portion pitch: 250 µm), for optical waveguide cores, which each have a square section, as illustrated in FIGS. 1C and 1D; and non-illustrated convex portions (width: 50 µm, height: 50 µm, and length of each side: 2 mm), for alignment marks, which have two square planar sections. Next, this is post-baked at 120° C. to form a master plate for forming optical waveguide cores.

<Formation of a PDMS Mold>

Next, a releasing agent is applied onto this master plate and then a heat-curable dimethylsiloxane resin (SYLGRD 184, manufactured by Dow Corning Asia Ltd.) is poured into this master plate and heated at 120° C. for 30 minutes to be solidified. The resin is then removed as a mold (thickness: 5 mm) having concave portions corresponding to the above-mentioned optical waveguide core convex portions and alignment mark convex portions having the square sections.

Furthermore, holes of 3 mm diameter are hollowed out in the mold so as to reveal both ends of the core concave portions, thereby forming an inlet and an outlet for the ultraviolet ray-curable resin. Ends are cut to reveal both ends of the concave portions corresponding to the two alignment mark convex portions. The resultant is used as a mold (see FIG. 7C).

<Formation of an Optical Waveguide Film>

Figure 7F:
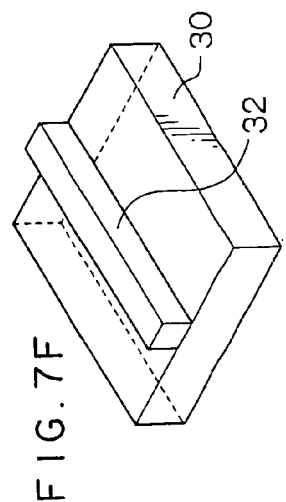

The mold and a light-transmissive clad film (Arton film, manufactured by JSR Corp., refractive index: 1.510) which has a design film thickness of 188 µm and is a size larger than the mold are prepared. The light-transmissive clad film and the mold are brought into close contact with each other. Next, several droplets of an ultraviolet ray-curable resin (PJ3001, manufactured by JSR Corp.) having a viscosity of 1300 mPa·s are dropped into the hole at one end of each of the optical waveguide core concave portions formed in the mold. The air is sucked from the other end at a sucking power of 20 kPa by means of a diaphragm type sucking pump (maximum sucking pressure: 33.25 kPa). As a result, the ultraviolet ray-curable resin is filled into each of the concave portions (see FIG. 7D). Next, UV rays having an energy of 50 mW/cm$^2$ are radiated onto the ultraviolet ray-curable resin through the mold for 5 minutes to cure the resin. The mold is removed from the light-transmissive clad film to form optical waveguide cores and alignment marks having the same shapes as the master plate convex portions on the light-transmissive clad film (see FIG. 7E). The refractive index of the optical waveguide cores with the alignment marks is 1.591. This optical waveguide film is cut into a rectangular shape to cut off the core ultraviolet ray-curable resin reservoir portions at the ends, thereby forming a ridge-form optical waveguide film having no projections other than the convex portions of the cores (see FIG. 7F). A similar step is performed to form alignment marks. The used ultraviolet ray-curable resin exhibits pink color when cured.

<Formation of a Laminated Polymer Optical Waveguide>

Two optical waveguide films formed in the same way as described above and an Arton film having the same size are prepared. An ultraviolet ray-curable resin (manufactured by JSR Corp.) having a refractive index of 1.510 after the resin is cured, this index being equal to that of the light-transmissive clad film (the Arton film), and having a volume shrinkage ratio of 5% or less is applied onto the entire surface of each of the above-mentioned three films by means of an applicator, so as to have a thickness of about 250 µm. Thereafter, the three films are laminated. Furthermore, the relative position of the two optical waveguide films is finely adjusted on the basis of the alignment marks by use of a microscopic optical system above the lamination, and then UV rays having an energy of 50 mW/cm$^2$ are radiated onto the lamination for 10 minutes to solidify the resin layers. In this way, a flexible laminated polymer optical waveguide is obtained. The same ultraviolet ray-curable resin as described above is used to laminate an Arton film onto the laminated polymer optical waveguide. The relative position errors of the laminated optical waveguide films are 2 µm or less in the plane direction and the thickness direction.

Unnecessary portions, wherein the adhesive agent is forced out, and ends faces of the optical waveguide cores are cut with a dicing saw, to form a laminated polymer optical waveguide wherein the two optical waveguide films which each have eight optical waveguide cores are laminated. In the laminated polymer optical waveguide, cuts are made on dicing lines as shown by the broken lines in FIG. 2B along the longitudinal direction of the optical waveguide. The width of a cutting margin is 0.11 mm. Thereafter, strip-shaped structures which contain four cores from among the optical waveguide cores and are formed in the cutting step and adjacent strip-shaped structures are bent by 125 μm, respectively, so as to align the cores in the former structures with the cores in the latter structures with respect to the lamination direction. In this way, the cores are arranged on one straight line.

Next, the resultant laminated polymer optical waveguide is bonded to a light-emitting face of a 1×8 VCSEL array (manufactured by Fuji Xerox Co., Ltd.). The loss in the connected portions is within the range of 0.7 to 1 dB regarding the eight optical waveguide cores. In this state, the strip-shaped structures can be bent into a curvature radius of 5 mm without bending the body of the laminated polymer optical waveguide.

Example 2

A master plate and a PDMS mold are first formed in the same way as in Example 1.

<Formation of an Optical Waveguide Film>

The mold and a light-transmissive clad film (Arton film, manufactured by JSR Corp., refractive index: 1.510) of 188 μm design film thickness wherein unnecessary portions are cut off as illustrated in FIGS. 2A and 2B are prepared. The light-transmissive clad film and the mold are brought into close contact with each other. Next, several droplets of an ultraviolet ray-curable resin (PJ3001, manufactured by JSR Corp.) having a viscosity of 1300 mPa·s are dropped into the hole at one end of each of the optical waveguide core concave portions formed in the mold. The air is sucked from the other end at a sucking power of 20 kPa by means of a diaphragm type sucking pump (maximum sucking pressure: 33.25 kPa). As a result, the ultraviolet ray-curable resin is filled into each of the concave portions. Next, UV rays having an energy of 50 mW/cm² are radiated onto the ultraviolet ray-curable resin through the mold for 5 minutes to cure the resin. The mold is removed from the light-transmissive clad film to form optical waveguide cores and alignment marks having the same shapes as the master plate convex portions on the light-transmissive clad film. The refractive index of the optical waveguide cores with the alignment marks is 1.591. This optical waveguide film is cut into a rectangular shape to cut off the core ultraviolet ray-curable resin reservoir portions at the ends, thereby forming a ridge-form optical waveguide film having no projections other than the convex portions of the cores. A similar step is performed to form alignment marks. The used ultraviolet ray-curable resin exhibits pink color when cured.

<Formation of a Laminated Polymer Optical Waveguide>

Two optical waveguide films formed in the same way as described above and an Arton film having the same size are prepared. An ultraviolet ray-curable resin (manufactured by JSR Corp.) having a refractive index of 1.510 after the resin is cured, this index being equal to that of the light-transmissive clad film (the Arton film), and having a volume shrinkage ratio of 5% or less is applied onto the entire surface of each of the above-mentioned three films by means of an applicator, so as to have a thickness of about 250 μm. Thereafter, the three films are laminated. Furthermore, the relative position of the two optical waveguide films is finely adjusted on the basis of the alignment marks by use of a microscopic optical system above the lamination, and then UV rays having an energy of 50 mW/cm² are radiated onto the lamination for 10 minutes to solidify the resin layers. In this way, a flexible laminated polymer optical waveguide is obtained. The same ultraviolet ray-curable resin as described above is used to laminate an Arton film onto the laminated polymer optical waveguide. The relative position errors of the laminated optical waveguide films are 2 μm or less in the plane direction and the thickness direction.

Unnecessary portions, wherein the adhesive agent is forced out, and ends faces of the optical waveguide cores are cut with a dicing saw, to form a laminated polymer optical waveguide wherein the two optical waveguide films which each have eight optical waveguide cores are laminated. In the laminated polymer optical waveguide, cuts are made on dicing lines as shown by the broken lines in FIG. 2B along the longitudinal direction of the optical waveguide. The width of a cutting margin is 0.11 mm.

Thereafter, by bending strip-shaped structures produced in the cutting step, the optical waveguide cores in the strip-shaped structures are aligned with the optical waveguide cores in the adjacent strip-shaped structures with respect to the lamination direction. In this way, the cores are arranged on one straight line. In this state, the laminated polymer optical waveguide is bonded to a lamination direction datum face of an MT connector wherein a hole is hollowed out in the upper portion. For the bonding, an ultraviolet ray-curable resin to which a colored expanding agent is added not to generate substantial volume shrinkage is used. The laminated polymer optical waveguide in this state is connected to an optical fiber array connected to the MT connector. As a result, the loss in the connected portions is within the range of 0.7 to 1.2 dB regarding the eight optical waveguide cores.

What is claimed is:

1. A laminated polymer optical waveguide comprising two or more optical waveguide films each of which comprises an optical waveguide core on a light-transmissive clad film, the two or more optical waveguide films being laminated on each other by using a clad-forming curable resin having a refractive index close to that of the light-transmissive clad film, wherein the laminated polymer optical waveguide comprises, at an end thereof, a plurality of strip-shaped structures which each comprise at least one optical waveguide core and which can be each independently bent in the direction along which the optical waveguide films are laminated.

2. The laminated polymer optical waveguide of claim 1, wherein, in the vicinity of an end of each of the optical waveguide films, an area where the optical waveguide core is not present is removed.

3. The laminated polymer optical waveguide of claim 1, wherein at least one of the strip-shaped structures is bent to arrange end faces of the optical waveguide cores in the different strip-shaped structures at given intervals.

4. The laminated polymer optical waveguide of claim 3, wherein ends of the strip-shaped structures are fixed to a fixed face.

5. The laminated polymer optical waveguide of claim 4, wherein the ends of the strip-shaped structures are fixed to an optical connector.

6. The laminated polymer optical waveguide of claim 1, wherein at least one of the strip-shaped structures is bent to be aligned with a strip-shaped structure adjacent thereto with respect to a direction along which the optical waveguide films are laminated, thereby arranging end faces of the optical waveguide cores in the different strip-shaped structures along a straight line.

7. The laminated polymer optical waveguide of claim 1, wherein a refractive index of the light-transmissive clad film is less than 1.55.

8. The laminated polymer optical waveguide of claim 1, wherein the clad-forming curable resin comprises at least one selected from the group consisting of epoxy ultraviolet ray-curable resins, polyimide ultraviolet ray-curable resins and acrylic ultraviolet ray-curable resins.

9. The laminated polymer optical waveguide of claim 1, wherein a refractive index of the optical waveguide core is from 1.20 to 1.60.

10. A process for producing the laminated polymer optical waveguide of claim 1, comprising:
performing the following processes (a) to (e) two or more times to form two or more optical waveguide films:
(a) preparing a mold which is made of a mold-forming-curable resin and has a concave portion corresponding to a convex portion of an optical waveguide core,
(b) bringing a light-transmissive clad film into close contact with the mold,
(c) filling a core-forming curable resin into the concave portion of the mold with which the light-transmissive clad film is in close contact,
(d) curing the filled core-forming curable resin, and
(e) removing the mold from the light-transmissive clad film;
laminating the two or more optical waveguide films by using a clad-forming curable resin; and
forming a plurality of strip-shaped structures in a laminated product made of the laminated optical waveguide films.

11. The process of claim 10, wherein the mold has a plurality of concave portions to form alignment marks on the optical waveguide films, and the two or more optical waveguide films are laminated by using the alignment marks.

12. The process of claim 10, further comprising cutting ends of the strip-shaped structures simultaneously in a state in which at least one of the strip-shaped structures is bent and in which end faces of the optical waveguide cores in the different strip-shaped structures are arranged and fixed at given intervals.

13. The process of claim 11, further comprising cutting ends of the strip-shaped structures simultaneously in a state in which at least one of the strip-shaped structures is bent and in which end faces of the optical waveguide cores in the different strip-shaped structures are arranged and fixed at given intervals.

* * * * *